Jan. 3, 1956  W. S. KARR ET AL  2,728,986
MOSAIC FRAME AND METHOD OF MAKING MOSAIC MAPS
Filed Jan. 23, 1952  3 Sheets-Sheet 1

*INVENTOR.*
WILLIAM SHIRLEY KARR
BY ALVA F. WARREN

*Richard A. Parsons*

Jan. 3, 1956  W. S. KARR ET AL  2,728,986
MOSAIC FRAME AND METHOD OF MAKING MOSAIC MAPS
Filed Jan. 23, 1952  3 Sheets-Sheet 2

INVENTOR.
WILLIAM SHIRLEY KARR
BY ALVA F. WARREN

*Richard A. Parsons*

Jan. 3, 1956 W. S. KARR ET AL 2,728,986
MOSAIC FRAME AND METHOD OF MAKING MOSAIC MAPS
Filed Jan. 23, 1952 3 Sheets-Sheet 3

*INVENTOR.*
WILLIAM SHIRLEY KARR
*BY* ALVA F. WARREN

*Richard A. Parson*

United States Patent Office 2,728,986
Patented Jan. 3, 1956

2,728,986

MOSAIC FRAME AND METHOD OF MAKING MOSAIC MAPS

William Shirley Karr and Alva F. Warren, Lansing, Mich., assignors to Abrams Aerial Survey Corporation, Lansing, Mich., a corporation of Michigan Application January 23, 1952, Serial No. 267,892

3 Claims. (Cl. 33—1)

This invention relates to the art of making maps from a series of related aerial photographs. It is particularly directed to the production of mosaics of individual units of the entire area to be mapped.

In making a photographic mosaic of terrain to be mapped, a series of overlapping aerial photographs is taken of the terrain. From these, ratioed prints are made which have been corrected for tip and tilt of the airplane and also for differences in its elevation. By means of ground survey and by radial line control prominent control points are located and are plotted upon a control base. The control base is ruled into quadrangles drawn to a suitable scale, the quadrangles being bounded by parallels of latitude and meridians of longitude. Usually the quadranges subtend 7½ or 15 minutes in each direction, and of course can be to any suitable scale.

The photographs are pasted upon the base in proper coordination with the control points, thereby resulting in a mosaic map of the entire area. The map is divided into units by lines representing parallels and meridians. A border of white paper is mounted around each unit, the border carrying suitable indicia, the unit and border reproduced by photographs.

The border necessarily covers part of adjacent units so it is necessary to remove the border, and apply a border to the adjoining unit for photographing it. These operations are time consuming.

The present invention has for its principal object the improving of this process by providing a base made up of units of accurate size permitting separation of the units after several are mosaiced so that each unit can be reproduced separately, and also permitting mosaicing of other units without completing the entire map at one time.

Another object is to provide a method of mosaicing in which the necessity of transferring control, particularly if established by the radial line control method, from a separate base to the mosaic boards by the use of overlays is eliminated, thereby preventing errors during transfer.

A still further object is to provide a method of the character mentioned in which control information can be plotted directly on the mosaic board assembly and carried across the entire area ahead of the mosaicing operation.

A further object is to provide a method of mosaicing such that the mosaic boards may be reassembled at any time after completion for making a study of an area larger than a single board, or for reproduction as a unit.

Another object is to eliminate the necessity of cutting away overlapping portions of the mosaic outside of the edges of the geographic lines of each quadrangle and reassembling these portions onto adjoining quadrangles in order to maintain a detail match between quadrangles.

These objects will more fully appear in the following specification when read in connection with the accompanying drawings, wherein.

Figure 1:
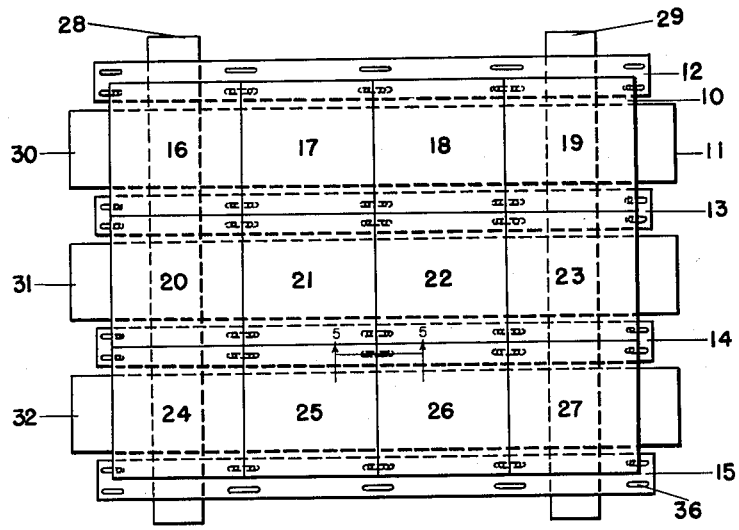
Figure 1 is a plan view showing assembly of mosaic boards on the frame.
Figure 2:
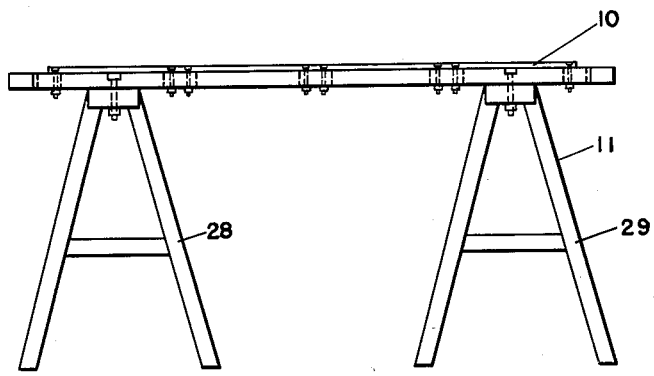
Figure 2 is a front view of the mosaic board frame and stand.

Referring now to the drawings in more detail, Figures 1 and 2 illustrate a mosaic board assembly 10 mounted on a stand 11.

The mosaic board assembly is composed of a plurality of strips of wood 12, 13, 14 and 15 and a plurality of mosaic boards 16 to 27 inclusive. The boards are attached to the strips 12 to 15 as will be more fully pointed out hereinafter.

Figure 4:
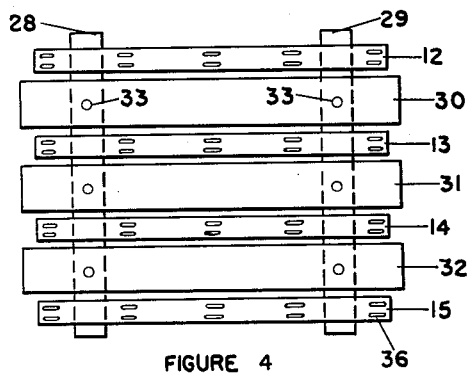
Figure 4 is a plan view of the mosaic board assembly frame.

The stand 11 (see Figure 2) consists of two (or more) trestles 28 and 29, to which are bolted three (or more) cross pieces 30, 31 and 32 by bolts 33. (See Figure 4.)

Figure 3:
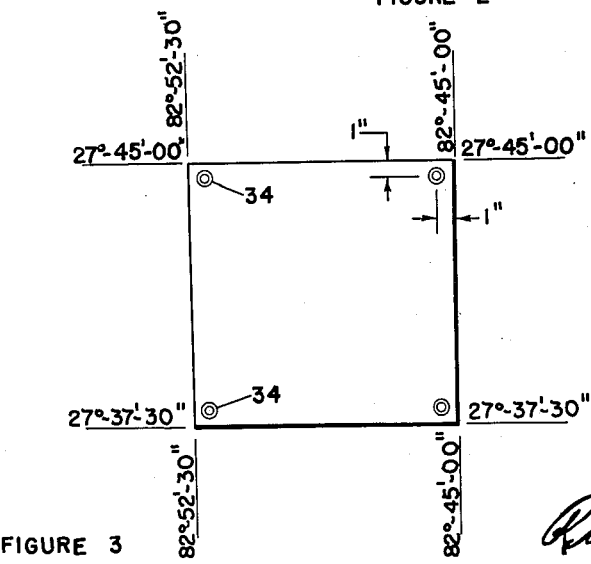
Figure 3 is a plan view of machined mosaic board used in practicing the invention.

The mosaic boards 16 to 27 are made from very hard, smooth material, such as tempered "Masonite." They are very carefully machined on their edges to dimensions representing quadrangles in the finished survey. Thus the edges correspond to geographic lines such as meridians of longitude and parallels of latitude in polyconic projection. Each quadrangle usually represents 7½ or 15 minutes of angle in each direction. This is illustrated in Figure 3 which shows a mosaic board made to represent 7½ minutes of angle, and as can be seen, will not be truly rectangular. These mosaic boards can also be machined to dimensions representing quadrangles in other projections or areas formed by grid lines at various scales.

Figure 5:
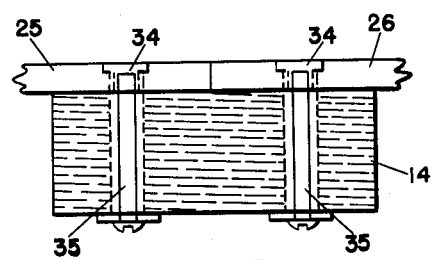
Figure 5 is a sectional view on an enlarged scale taken on substantially the line 5—5 of Figure 1.

In each corner of each board is a head of a "Chicago" screw 34 (see Figures 3 and 5) set flush with the upper surface of the board and terminating at or short of the lower surface. The boards 16 to 27 are attached to the strips 12 to 15 by screws 35 extending through slots 36 (see Figure 4), in the strips 12 to 15 in the manner indicated in Figure 5. The slots 36 (see Figures 1 and 4) are provided to permit adjustment of the boards in abutting relationship. That is necessary because in many cases as in polyconic projections two opposite edges of the boards are not parallel, but converge very slightly as do meridians of longitude. In all cases they provide an adjustment so that the mosaic boards can be fitted tightly together even when the holes 34 (see Figure 3) are not exactly located.

It will be noted that only three horizontal rows of boards are shown. Only two rows of mosaic boards are necessary for the mosaicing operation, because as soon as the bottom row is covered with the mosaic and a start is made completely across the second row, the first row may be cut away, the second row moved down and a new row added to replace the original row, as will more fully appear presently. However, three rows of boards set up on the assembly frame at a time are preferable, because it permits plotting of control ahead of mosaicing.

Figures 9, 10:
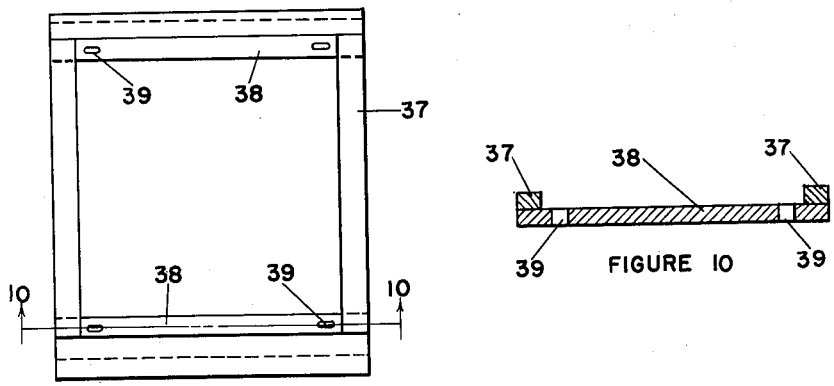
Figure 9 is a plan view of a mosaic copying frame.
Figure 10 is a cross-sectional view taken on substantially the line 10—10 of Figure 9.

Figures 9 and 10 of the drawings show a frame 37 for holding the individual quadrangles while being provided with a border and being photographed. It may be formed of any suitable material, but preferably it is formed of wooden strips attached together at the corners. The strips are of the same thickness as the mosaic boards 16 to 27, and the dimensions of the frame are such as to fit the largest board closely. Actually it will fit all of the boards reasonably closely as there is very little difference in the sizes of the mosaic boards.

Figure 11:
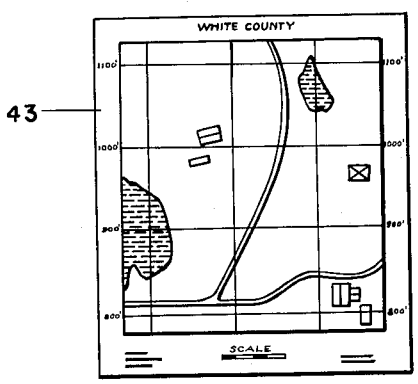
Figure 11 is a plan view of a completed mosaic quadrangle.

At each end of the frame, and attached to the underside thereof, are supporting strips 38. These strips have portions thereof underlying the open portion of the frame, as clearly shown in Figure 9, to support the mosaic boards in the frame. The strips 38 have slots 39 therein through which the "Chicago" screws 35 (see Figure 5) may be threaded into heads 34 in the boards to fasten each board to the frame. A board is shown in place in Figure 11, of which more will be said later.

In carrying out the method of the present invention, the procedure is common practice to the time actual mosaicing is begun. The necessary properly restituted and ratioed photographs are prepared from the original flight negatives.

Figure 6:
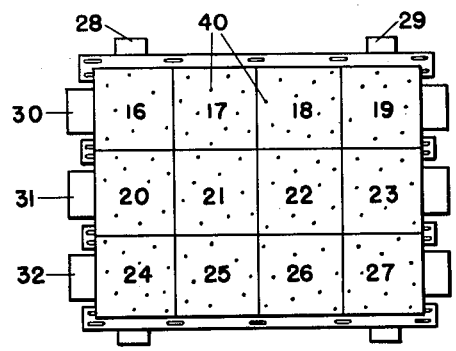
Figure 6 is a plan view of the mosaic board assembly with primary control points plotted thereon.

Figure 6 shows three rows of boards mounted on the mosaic assembly frame. Ground control points 40 are plotted on the mosaic boards in the usual manner, by pricking holes in the proper locations with a fine needle and suitably identifying them. The edges of the boards themselves represent the geographic lines, i. e., meridians and parallels. Mosaicing is then commenced by pasting the corrected photographs on the boards, being careful to locate the ground control points on the photographs in proper register with the corresponding points on the boards. This is done by means of the pricked holes in the mosaic boards.

Figure 7:
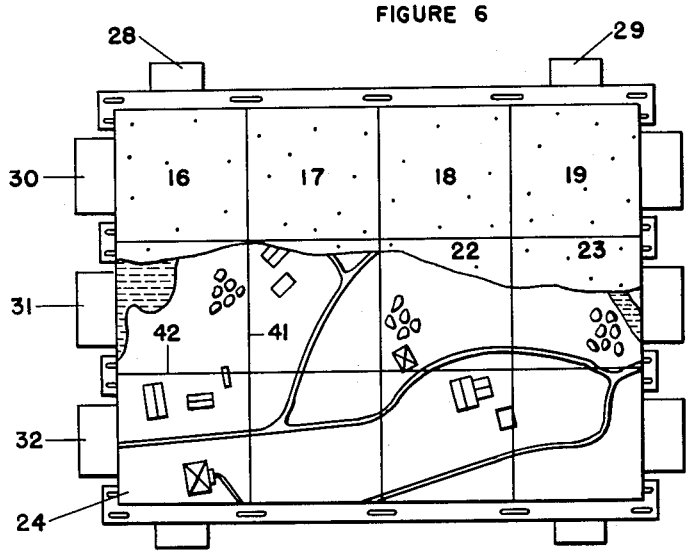
Figure 7 is a plan view of the mosaic board assembly with a partially completed mosaic thereon.
Figure 8:
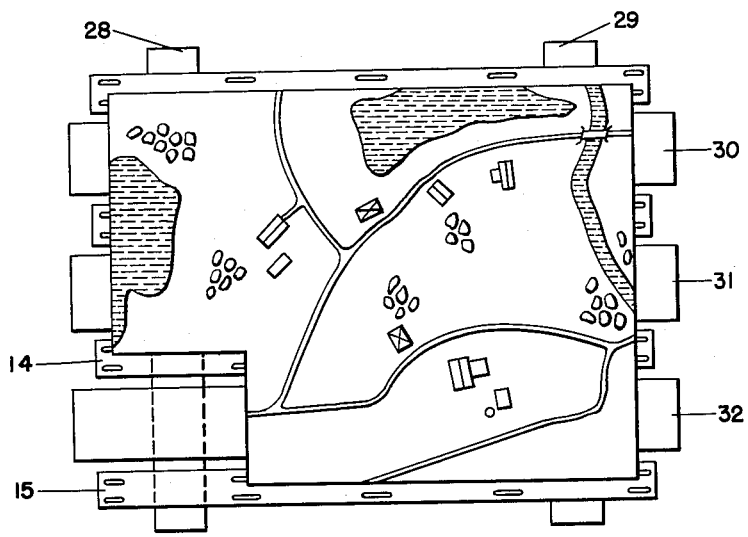
Figure 8 is a view similar to Figure 7 showing the mosaic completed and with one mosaic board removed.

Mosaicing is carried on across all of the boards in the first or bottom tier (in Figure 7) of boards, and started on the second tier, as indicated in Figure 7. The geographic lines 41 and 42 (i. e. parallels and meridians, respectively) are then drawn on the mosaic in the first two tiers directly over the adjoining edges of the mosaic boards. The lines can be twice the thickness allowed by the specifications laid down for the mosaic map. The mosaic quadrangles in the first row are then carefully cut apart by splitting the geographic lines 41 and 42 with a razor blade or sharp knife and cutting through into the slit between adjacent mosaic boards. The boards can then be removed individually from the frame. See Figure 8 wherein board number 24 has been cut out and removed.

The mosaic boards in the remaining tiers with the mosaic partially completed thereon are moved as a unit to the opposite side of the frame, other boards are added to form another tier, and mosaicing is carried on as before.

The boards which have been removed can then be turned over to various individuals for completion and photographing.

In completing each quadrange it is placed in copying frame 37 (see Figure 9) and secured therein by the "Chicago" screws. All names or numbers identifying features or control are placed on the map. Contours also may be shown if desired. A border of white paper 43 (see Figure 11) is placed on the frame 37 around and abutting the edge of the mosaic quadrangle placed therein. On that border may be printed desired identifying material for the quadrangle, after which the quadrangle and border may be photographed as a unit for reproduction.

The boards can all be reassembled without their borders and can be photographed for reproduction as a unit, where an overall map of the mapped area is desired. Either the entire assembly can be reassembled for photographing or any portion thereof.

Accordingly, it will be seen that the present invention is a great improvement over the prior practices. It permits speedier completion of the entire map as more persons can work on the project wtihout interfering with each other. Furthermore, the individual mosaic boards can be reassembled to show the complete area mapped if desired or any portion thereof. Also the necessity of transferring the control information from a separate base to the mosaic boards is eliminated.

The scope of the invention is indicated by the appended claims.

We claim:

1. The method of making mosaic maps which comprises the steps of providing a mosaic assembly support comprising a frame and a plurality of mosaic boards detachably connected thereto in a common plane, said mosaic boards being arranged in abutting relationship in a plurality of abutting rows, said boards being accurately cut to scale and representing quadrangles of the area to be mapped, plotting on said boards ground control points, assembling by the aid of said control points on the first row and at least a portion of the second row a photographic mosaic of the terrain to be mapped, cutting the mosaic boards in the first row from those in the second row and from each other at the edges of the abutting boards and removing those boards from the frame, and moving the remaining mosaic boards on the frame to permit the addition of another row of boards adjoining the farthest removed from the first row, so that additional control may be plotted on the added row.

2. The method of making mosaic maps which comprises the steps of providing a mosaic assembly support comprising a frame and a plurality of mosaic boards detachably connected thereto in a common plane, said mosaic boards being arranged in abutting relationship in a plurality of abutting rows, said boards being accurately cut to scale and representing quadrangles of the area to be mapped, plotting on said boards ground control points, assembling by the aid of said control points on at least one board in the first row and also a portion of the boards adjoining said first mentioned board a photographic mosaic of the terrain to be mapped, cutting the mosaic on the first mentioned board from the mosaic on the adjoining boards and removing said first mentioned board from the frame.

3. The method according to claim 2 wherein an individual mosaic board is mounted in a frame after separation from the adjoining boards and an indicia carrying border is mounted on the frame in abutting relationship to the edges of the board.

References Cited in the file of this patent

UNITED STATES PATENTS

| | | |
|---|---|---|
| 863,670 | Summers | Aug. 20, 1907 |
| 1,537,634 | Watson | May 12, 1925 |
| 2,352,413 | Schuch et al. | June 27, 1944 |